United States Patent [19]

Mizukami et al.

[11] Patent Number: 5,780,102
[45] Date of Patent: Jul. 14, 1998

[54] PROCESS FOR PRODUCING ALUMINA WITH HIGH SPECIFIC SURFACE AREA

[75] Inventors: Fujio Mizukami; Kazuyuki Maeda; Shuichi Niwa, all of Ibaragi-ken; Junichi Mine, Kanagawa-ken, all of Japan

[73] Assignees: Agency of Industrial Science & Technology; Nissan Motor Company, Limited, both of Japan

[21] Appl. No.: 794,701

[22] Filed: Nov. 20, 1991

Related U.S. Application Data

[63] Continuation of Ser. No. 403,517, Sep. 6, 1989, abandoned.

[30] Foreign Application Priority Data

Sep. 6, 1988 [JP] Japan ................... 63-221448

[51] Int. Cl.$^6$ ............... B05D 3/02; C01F 1/02; B01J 31/60
[52] U.S. Cl. ............ 427/226; 423/628; 423/630; 427/380; 502/171; 502/355
[58] Field of Search ................ 427/226, 380; 423/628, 630; 502/355, 171

[56] References Cited

U.S. PATENT DOCUMENTS

| | | | |
|---|---|---|---|
| 3,811,918 | 5/1974 | Lerene | 427/375 |
| 4,275,052 | 6/1981 | Ryu | 423/628 |
| 4,387,085 | 6/1983 | Fanelli et al. | 423/630 |
| 4,649,037 | 3/1987 | Marsh et al. | 423/338 |
| 4,713,233 | 12/1987 | Marsh et al. | 423/266 |
| 4,960,618 | 10/1990 | Tanitsu et al. | 427/226 |

FOREIGN PATENT DOCUMENTS

| | | |
|---|---|---|
| 706 356 | 3/1965 | Canada. |
| 0177198 | 4/1986 | European Pat. Off.. |
| 0 199 930 | 5/1986 | European Pat. Off.. |
| 0197686 | 10/1986 | European Pat. Off.. |
| 61-68314 | 6/1987 | Japan. |
| 2 219 007 | 11/1989 | United Kingdom. |

OTHER PUBLICATIONS

Pettit et al "Use of Sol Gel Thin Films In Solar Energy Application" Sandia National Lab., Albuqueque, N.M. 1985.

J. Chem. Soc. Faraday Trans., "Thermal Behaviour of Alumina From Aluminium Alkoxide Reacted with Complexing Agent," 1992, 88(1), 97–104, (no mo.).

*Primary Examiner*—Janyce Bell
*Attorney, Agent, or Firm*—Pennie & Edmonds LLP

[57] ABSTRACT

A process includes a step of melting aluminium alkoxide in hexylene glycol (2-methyl 2,4-pentonediol). Then, the solution is subject hydrolysis. During this, hydrolysis and dehydrating condensation of hexylene glycol is controlled by alkoxide. This is found effective for obtaining alumina having uniform porous structure with high specific surface area.

9 Claims, No Drawings

PROCESS FOR PRODUCING ALUMINA WITH HIGH SPECIFIC SURFACE AREA

This application is a continuation of U.S. Ser. No. 07/403,517 filed Sep. 6, 1989, now abandoned.

BACKGROUND OF THE INVENTION

1. Field of the Invention

The present invention relates generally to a process for producing alumina with high specific surface area. more specifically, the invention relates to a process for producing alumina which can hold high specific surface area at high temperature and thus suitable for use as substrate or support for combustion gas or combustion exhaust gas purification catalyst or for sensor which are subject substantially high temperature.

2. Description of the Background Art

In the modern technologies, one of major task to be achieved is environmental air purification. Corrective measure have been taken place to reduce the emission to the atmosphere from mobile and stationary source, such as automotive vehicle, power station, fossil fuel burner, oil stove and so forth. Effective mission control is often obtained by the use of noble metal catalyst, such as platinium (Pt), rhodium (Rh) and so forth, and to the date, the normal substrate for these catalysts has been a porous ceramics, either in pelleted or cellular monolith form. Such ceramic substrate for supporting catalysts has gained greater acceptance in high-flow velocity operation due to the low pressure drop inherent in its configuration. However, the physical properties of these ceramic substrates are not ideal since they are relatively fragile and liable to thermal shock fracture. In order to improve such shortcoming in the ceramic substrate, various attempt has been made. For example, in Platinum Metals Review vol. 21, No. 3 (1977), A. S. Prautt and J. A. Caurns discloses Noble Metal Catalysts on Metallic Substrate. Prautt and Caurns has proposed use of catalyst supporting substrate formed of aluminium-containing ferric steel with alumina surface coating.

On the other hand, SAE Technical Paper Ser. No. 850131, Feb. 25 - Mar. 1, 1985, by Manfred Nonnenmann, proposes Metal Supports for Exhaust Gas Catalysts Nonnenmann discloses that, an exhaust gas catalyst designed for reducing the amount of pollutants emitted from motor vehicles consists essentially of catalytically effective substance, such as platinium, rhodium etc., embedded in a washcoat having a high specific surface area and applied to a support. This support determines the basic design of the catalyst, its mechanical characteristics and—by its geometric surface area—the catalytic action.

In the meanwhile, due to increasing of number of automotive vehicles manufactured and marketed or number of emission sources, such as combustioning equipments, and, due to increasing of strictness for emission control, needs of noble metal for use as catalysts are growing at substantial rate. Because of relatively small amount of reserves of noble metals, reduction of use amount of noble metal for catalyst becomes substantially important task to achieve. In order to achieve this, it is required to provide high performance in noble metal/alumina catalysts. For obtaining high performance in noble metal/alumina catalysts, It becomes necessary to use alumina substrate with high specific surface area. Conventionally, alumina with high specific surface area has been proposed. However, the noble metal/alumina catalysts in the prior art can not solve the problem of Substantial reduction of the specific surface area at high temperature. Namely, in the normal use as catalysts for automotive emission control, the catalysts are subject to high temperature exhaust gas in a temperature range of 600° C. to 1100°C., more practically 850° C. to 1100° C. For this reason, the conventionally proposed noble metal/alumina catalysts have not been suitable for satisfactorily reducing amount of noble metal while maintaining satisfactory emission control performance.

In order to improve this, Japanese Patent First (unexamined) Publication (Tokkai) Showa 60-226414 discloses alumina, to which lanthanum oxide is-added. On the other hand, in Chemistry Letters 1985, pp 151 to 154, there is proposed to add barium oxide to alumina for providing specific surface area in a range of 85 $m^2/g$ to 125 $m^2/g$ even after baking at 1000° C.

On the other hand, as will be appreciated, in case of exhaust gas purification catalyst in the automotive exhaust system or in an gas turbine. the conventionally proposed alumina substrate will not provide sufficiently high specific surface area in view of possibility of subjecting substantially high flow velocity of exhaust gas from the engine or turbine or possibility of causing caulking due to use of fuel, such as aromatic compound. Therefore, in order to obtain satisfactorily high performance in air purifications higher specific surface area is required for the catalyst substrate. In order to provide this requirement, a conventionally used metal substrate is formed of heat-resistive material, such as mullite, cordielite and so forth and formed into honeycomb structure. The metal substrate is washcoated by noble metal/alumina catalyst or coated by catalyst support thereon and subsequently impregnated with noble metal. During such a coating process additives, such as barium oxide and lanthanum oxide, are washed out or eluted from the composite alumina, making the coating process difficult. In addition, due to liquation and coating operation thereon, purification performance of the catalyst tends to be degraded significantly.

SUMMARY OF THE INVENTION

In view of the shortcoming in the prior art, it is an object of the present invention to provide a process for producing an alumina having a property of holding high specific surface area at high temperature range.

In order to accomplish the aforementioned and other objects, a process, according to the present invention, includes a step of melting aluminium alkoxide in hexylene glycol (2-methyl 2,4-pentanediol). Then, the solution is subject to a hydrolysis process. The hydrolysis process and dehydrating condensation of hexylene glycol is controlled by alkoxide. This is found effective for obtaining alumina having uniform porous structure with high specific surface area.

According to the preferred process according to the invention, the solution of aluminium alkoxide and hexylene glycol (2-methyl 2,4-pentanediol is heated in a range of temperature of 101° C. to 200° C. to obtain sol. Gel is obtained from sol through the hydrolysis process. Obtain gel is dried and finally baked at a temperature 750° C. or above.

According to one aspect of the invention, a process of producing alumina comprises of steps:

adding aluminium alkoxide to hexylene glycol (2-methyl 2,4-pentanediol), and heating at a temperature in a range of 101° C. to 200° C. for forming sol;

subsequently performing hydrolysis for forming gel from sol; and drying obtained gel and baking dried gel at a temperature higher than or equal to 750° C.

The hexylene glycol is in amount greater than or equal to 0.5 mol versus 1 mol of aluminium alkoxide and leas than or equal to 5 mol versus 1 mol of aluminium alkoxide. Further preferably, the hexylene glycol is in amount less than or equal to 3 mol versus 1 mol of aluminium alkoxide.

The hydrolysis process is performed by adding water in amount more than or equal to 0.5 mol versus 1 mol of aluminium alkoxide. Also, the hydrolysis process is performed by adding water in amount less than or equal to 20 mol versus 1 mol of aluminium alkoxide. More preferably, water is added in amount ranging 2 mol to 10 mol versus 1 mol of aluminium alkoxide.

Aluminium alkoxide is selected among aluminium metboxide, aluminium ethoxide, aluminium iso-propoxide, aluminium n-propoxide, aluminium n-butoxide, aluminium sec-butoxide, aluminium tert-butoxide.

The process may further include step of putting or impregnating the Sol, before the end is transformed to gel, or the transformed sol, the gel, onto a support and subsequently perform drying and baking process.

According to another aspect of the invention, a process of producing alumina coated metal substrate for catalyst, comprises of steps:

adding aluminium alkoxide to hexylene glycol (2-methyl 2,4-pentanediol), and heating at a temperature in a range of 101° C. to 200° C. for forming sol;

subsequently performing hydrolysis for forming gel from sol;

putting or impregnating the sol, before the sol is transformed to gel, or the transformed sol, the gel, onto a metallic support; and drying the transformed sol, the gel, sol on the metallic support obtained gel and baking dried gel at a temperature higher than or equal to 750° C.

DETAILED DESCRIPTION OF THE INVENTION

In the preferred process in production of alumina, aluminium alkoxide is put in hexylene glycol (2-methyl-2,4-pentanediol) to form a solution. The solution is then heated at a temperature in a range of 101° to 200° C. The solution in a form of sol is then subject to hydrolysis to form gel. The produced gel is dried and baked at a temperature higher than or equal to 750° C.

Generally, aluminium ion may form tetracoordinated tetrahedron and octacoordinated octahedron. Alumina is a high polymer created by covalent bonding of the polygons at those peaks, edge or face via oxygen or hydroxyl group. Accordingly, various structure and various molecular alumina can be produced depending upon kind and structure of hydroxide produced through hydrolysis process and progress of dehydrating condensation. Naturally, the specific surface area of alumina is variable depending upon the structure and molecular thereof. Generally, higher specific surface area can be obtained with smaller molecular, in other words smaller particle size of the primary particle. Also, tetrahedron structure will provide higher specific surface area than octahedron. However, when the particle size is too small, surface energy become excessive and non-bridged hydroxyl group is increased. This encounters high possibility of causing simple fusion or dehydrating fusion at high temperature to cause lowering of specific surface area. On the other hand, in case that excess number of tetrahedron structure aluminium in particle, non-bridged coordinated water or hydroxyl group is increased for neutrization of electric charge. This also cause lowering of specific surface area. Therefore, in order to obtain alumina with high specific surface area at high temperature, hydrolysis process and dehydrating polymerization process have to be appropriately adjusted and controlled so as to obtain appropriate structure and molecular of primary particle of alumina.

In view of this, according to the invention, hydrolysis and condensation of aluminium alkoxide is controlled by hexylene glycol. Hexylene glycol used for implementing . the present invention has two hydroxyl group. This hexylene glycol reacts with aluminium alkoxide in complex formation and ligand conversion, for forming unidentate ligand of aluminium ion and single hydroxyl group or for chelate coordination or bridging coordination with two hydroxyl group. Therefore, by blocking and bridging coordinating point, i.e. the peaks of tetrahedron and octahedron, hydrolysis. and dehydrating polymerization of aluminium alkoxide can be controlled. Thus, solation and gelation of aluminiun alkoxide can be controlled. AS a result, alumina with uniform quality and with high specific surface area at high temperature can be obtained.

To implement the invention, it is possible to use any alkoxide irrespective of type of alkil group to form aluminium alkbxide. Furthermore, material which easily form alkoxide in hexylene glycol, such as anhydrous aluminium halogenide, can be used. Preferably, aluminium alkoxide is selected among aluminium methoxide, aluminium ethoxide, aluminium iso-propoxide, aluminium n-propoxide, aluminium n-butoxide, aluminium sec-butoxide, aluminium tert-butoxide and so forth in view of coat and processing ability.

As set forth above, since hexylene glycol acts not only as solvent but also as agent for controlling reaction of aluminium alkoxide, amount of hexylene glycol is preferably adjusted to be more than or equal to 0.5 mol versus 1 mol of aluminium alkoxide. Furthermore, as set forth above, the heating temperature for heating the solution of aluminium alkoxide and hexylene glycol (2-methyl 2,4-pentanediol) is preferably in a range of 101° C. to 200° C. as set forth above. On the other hand, when excessive amount of hexylene glycol is used, unacceptably large amount of organic compound is remained even after hydrolysis or particle size becomes too small to cause fusion for lowering specific surface area. Therefore, the maximum amount of hexylene glycol is 5 mol. Furthermore, it is preferred to limit the amount of hexylene glycol less than or equal to 3 mol versus 1 mol of aluminium alkoxide. Generally, when relatively small amount of hexylene glycol is used, it may cause difficulty in solving aluminium alkoxide. In such a case, another solvent may be used. As a solvent, any type of solvent which can solve both of aluminium alkoxide and hexylene glycol and has weaker coordinating ability to aluminium than hexylene glycol. For axample, monodydric alcohol, ethers, hydrocarbon and so forth, may be used as a solvent. On the other hand, if the heating temperature is too low, reaction of complex formation and ligand conversion of aluminium alkoxide and hexylene qlycol becomes unacceptably slow. Furthermore, excessively low heating temperature may cause difficulty in causing polymerization of aluminium alkoxide with hexylene glycol as inclusion. Therefore, the temperature range in heating process is preferred in the range set forth above.

Amount of water used in hydrolysis process is closely related to the amount of alumina particle to be produced and the specific surface area of alumina. When amount of water used in the hydrolysis process is too small, alumina gel after drying process may contain unacceptably large amount of organic compound to make it easy to cause fusion during high temperature baking process. On the other hand, excess amount of water may create large molecular of alumina particle produced through solation and gelation process for reducing the specific surface area. Therefore, the amount of water to be used in hydrolysis process is preferred to be in a range of 0.5 mol to 20 mol versus 1 mol of aluminium alkoxide, and further preferably in a range of 2 mol to 10 mol. Water may be directly added, or, in the alternative added with diluting by appropriate solvent.

In the preferred process of the invention, the solution after adding the water is processed into gel form via gel form, it is possible to dry the obtained sol under reduced pressure. In the alternative, It may also be possible to put or impregnate the sol or the transformed sol, the undried gel to honeycomb support and subsequently dry under reduced pressure. Therefore, any way can be taken for drying the obtained gel.

The preferred temperature of baking, in the preferred process is 750 °C. or above. It is possible to perform pro-heating before performing baking process, at a temperature lower than or equal to 750° C. For pre-heating process no specific condition and atmosphere is required. Therefore, pre-heating process can be performed under atmosphere of air, oxygen, nitrogen, hydrogen, argon, helium and so forth. Furthermore, for pre-heating, range of temperature is not specified and can be used any temperature lower than or equal to 750° C. Also, baking at temperature 750° C. or above may require any specific condition and can be performed under the atmosphere of air or oxygen. Furthermore, the process time of baking is not specified.

Though the preferred process as set forth above, alumina having high specific surface area at high temperature can be obtained. Namely, alumina produced by the preferred process of the invention may hold satisfactorily high specific area through a long period of use at temperature of 1000° C. Furthermore, alumina is formed into gel through hydrolysis process, it make easy to impregnate or put the sol or the transformed sol, the gel, onto the support. In addition, since the dried gel contains relatively large amount of hexylene glycol, the hexylene glycol functions as a ligand in bonding same on the surface of a support without any additives.

In order to demonstrate the performance of the process according to the invention, experiments were taken place with respect to various examples.

EXAMPLE 1

In a beaker of 500 m capacity, 120.1 g of aluminium iso-propoxide $(Al(OisoPr)_3$ is put. To this, 108.3 g of hexylene glycol is added. Then, the beaker is put into an oil bath of 120° C. and stirred for 4 hours. Subsequently, the temperature of oil bath was lowered to 100° C., and 90 g of water is added to melt of aluminium alkoxide. At the constant temperature at 100° C., the beaker is maintained over night to obtain gel. Obtained gel was transferred to eggplant type flask and dried under reduced atmospheric pressure at a temperature in a range of 120° C. to 170° C. Through this, 39 g of dried gel was obtained. The obtained gel was heated at 300° C. for one hour, and baked at respective of 450° C., 600° C. and 800° C. for three hours, to obtain white alumina powder. No clear diffraction line could be observed in power x-ray diffraction. The specific surface area of the produced alumina is shown in the appended table.

EXAMPLE 2

Alumina obtained through the example 1 was baked at 1030° C. of temperature for three hours. The alumina did not show clear diffraction line through powder x-ray diffraction. On the other hand, pore distribution measured by mercury pressurization shows sharp distribution having a peak at 110A. This is evident that produced alumina has uniform grain size. The resultant specific surface area is shown in the appended table.

EXAMPLE 3

For alumina obtained through the example 2, further baking at 1030° C. was performed for 45 hours. The specific surface area of the resultant alumina is also shown in the appended table.

EXAMPLE 4

In a beaker of 200 m capacity, 60 g of aluminium iso-propoxide $(Al(OisoPr)_3$ is put. To this, 27.5 g of hexylene glycol is added. Then, the beaker is put into an oil bath of 10 120° C. and stirred for 3 hours. Subsequently, the temperature of oil bath was lowered to 100° C., and 45 g of water is added to melt of aluminium alkoxide and left for 4 hours. Content in the beaker is then transferred to eggplant type flask and dried under reduced pressure atmosphere at a temperature of 150° C. Through this, the dried gel was heated at respective of 200° C. and 300° C. for respective 1 hour, and subsequently baked at respective 450° C., 600° C. and 800° C. for three hours to obtain white alumina powder. No clear diffraction line could be observed in power x-ray diffraction. The specific surface area of the produced alumina is shown in the appended table.

EXAMPLE 5

Alumina obtained through the example 4 was further baked at 1030° C. for 3 hours. The alumina did not show clear diffraction line through powder x-ray diffraction. On the other hand, pore distribution measured by mercury pressurization shows sharp distribution having a peak at 108A. This is evident that produced alumina has uniform grain size. The resultant specific surface area is shown in the appended table.

EXAMPLE 6

In a beaker of 500 m capacity, 120.4 of aluminium iso-propoxide $(Al(OiSoPr)_3$ is put. To this, 108.4 g of hexylene glycol is added. Then, the beaker is put into an oil bath of 145° C. and stirred for 3 hours. subsequently, the temperature of oil bath was lowered to 100° C., and 90 g of water is added to melt of aluminium alkoxide. At the constant temperature at 100° C. the beaker is maintained over night to obtain gel. Obtained gel was transferred to eggplant type flask and dried under reduced pressure atmosphere at a temperature in a range of 120° C. to 170° C. The obtained gel was heated at 300° C. for one hour, and baked at respective of 450° C., 600° C., 800° C. and 1030° C for 3 hours to obtain white alumina powder. No clear diffraction line could be observed in power x-ray diffraction. On the other hand, pore distribution measured by mercury pressurization shows sharp distribution having a peak at 110A. This is evident that produced alumina has uniform grain size. The specific surface area of the produced alumina is shown in the appended table.

EXAMPLE 7

Except for the initial oil bath temperature, alumina was produced through the same condition to example 6. In this example, the initial oil bath temperature was set at 190° C.

Obtained alumina was non-crystallized y-alumina. Uniformity of grain size of the resultant alumina was confirmed through powder x-ray diffraction and pore distribution measurement. The specific surface area of the resultant alumina is shown In the appended table.

EXAMPLE 8

Except for the initial oil bath temperature, alumina was produced through the same condition to example 6. In this example, the initial oil bath temperature was set at 105° C. Obtained alumina was y-alumina of near amorphous structure. The specific surface area of the resultant alumina is shown in the appended table.

EXAMPLE 9

Except for amount of hexylene glycol, alumina was produced through the same process to the example 1. In this example, the amount of hexylene glycol was 150 g. No clear diffraction line was observed through powder x-ray diffraction. The resultant alumina had non-crytalized structure. The specific area of the obtained alumina is shown in the appended table.

EXAMPLE 10

Utilizing 142.2 g of aluminium sec-butoxide (Al(Osec-Bu)$_3$ as aluminium alkoxide, same process to the foregoing example 6 was performed. The resultant alumina was y-alumina with near amorphous structure. The specific surface area of the resultant alumina is shown in the appended table.

<Comparative Example In Production Process>

Comparative Example 1

Putting 120 g of aluminium iso-propoxide (Al(OisoPr)$_3$ and 100 g of Iso-propanol, stirring, was performed at 70° C. for 4 hours. Subsequently, 90 g of water was added. Though the process same as that mentioned below, alumina wax obtained. The specific surface area is shown In the appended table.

Comparative Example 2

Alumina obtained through the foregoing comparative example 1, was baked at 1030° C. for 3 hours. Pore distribution of obtained alumina was measured by mercury pressurization. As a result, it was found that the distribution was in a range of 80A to 1400A having five peaks. From this, it was found that the particle size of the resultant alumina was not uniform. The specific surface area of this comparative example 2 is shown in the appended table.

Comparative Example 3

For alumina produced from alumina alkoxide and available from the market was baked at 1000° for 48 hours. The specific surface area of the resultant alumina is shown in the appended table.

Comparative Example 4

201 g of aluminium nitrate is solved in 250 m of 30 water. To this, a solution produced by diluting 116 m of aqueous ammonia with 100 m of water, is added to cause precipitate aluminium hydroxide. After several times decantation, the solution was filtered and dried. Baking was performed through the process same as that in the example 1. The specific surface area of the resultant alumina is shown in the appended table.

Comparative Example 5

Alumina obtained through the comparative example 4 was baked at 1030° C. for 3 hours. The resultant alumina has pore distribution in a wide range of 200A to 200A. The specific surface area of the resultant alumina is shown in the appended table.

Comparative Example 6

To 155.5 g of solution of aluminium nitrate, solution of sodium aluminate was added until the pH of the solution reaches 7. Resultant precipitation was filtered and washed until white precipitation is not created by adding solution of barium nitrate to washing. Precipitation is dried and baked through the process same as the example 6. The pore distribution was in the wide range of 200A to 1100A. The specific surface area of the resultant alumina is shown in the appended table.

<Comparative Example In Solvent>

Comparative Example 7, 8, 9 10

In place of hexylene glycol in the foregoing example 1, respective of ethanolamine (Comparative Example 7), cyclohexan-1,4-diol (Comparative Example 8), pinacol (Comparative Example 9) and 3-methyl-1,3-buthadiol (Comparative Example 10) are used. Through the process same as the example 1, dried gels were obtained. The gel was heated at 300° C. for 1 hours and subsequently baked at respective temperature of 450° C., 600° C., 800° C. and 1000° C. for 3 hours. Respective specific surface areas are shown in the appended table. In these comparative examples 8 to 10, respective alumina had pore distribution in a range of 100A to 500A with 3 peaks. Therefore, these still have wider distribution range in comparison with the examples.

<Comparative Example In Reaction Temperature>

Comparative Example 11

145.4 g of aluminium sec-butoxide (Al(Osec-Bu)$_3$ is solved in 108.5 g of hexylene glycol. Solution is heated with stirring in oil batch at a temperature of 98° C. for 3 hours. Then, 90 g of water is added and left over night. Subsequently, process in the example 6 was performed to obtain alumina. Through power x-ray diffraction, it was found that the structure of obtained alumina is similar to y-alumina. The specific surface area is shown in the appended table.

Comparative Example 12

12 g of aluminium iso-propoxide (Al(OisoPr)$_3$ is solved in 108 g of hexylene glycol. Solution is heated with stirring within oil bath at a temperature of 80° C. Thereafter, 90 g of water is added and left over night. Subsequently process same as the example 6 was performed for obtaining alumina. The specific surface area of the resultant alumina is shown in the appended table.

As can be seen herefrom, the examples exhibits much higher than that of comparative examples. Therefore, the invention fulfills all of the objects and advantages sought therefor.

TABLE

|  | Production Process (Oil Bath Temp. °C.) | Final Baking Condition Temp. °C. | Hour | Specific Surface Area ($m^2/g$) | Examples to be Compared |
|---|---|---|---|---|---|
| EXAMPLE 1 | Invention (120) | 800 | 3 | 231 | Comp. 1 |
| EXAMPLE 2 | Invention (120) | 1030 | 3 | 146 | Comp. 2, 7, 8, 9, 10, 11 |
| EXAMPLE 3 | Invention (120) | 1030 | 48 | 100 | Comp. 3 |
| EXAMPLE 4 | Invention (120) | 800 | 3 | 238 | Comp. 1.4 |
| EXAMPLE 5 | Invention (120) | 1030 | 3 | 138 | Comp. 11, 12 |
| EXAMPLE 6 | Invention (145) | 1030 | 3 | 148 | Comp. 11, 12 |
| EXAMPLE 7 | Invention (190) | 1030 | 3 | 141 | Comp. 11, 12 |
| EXAMPLE 8 | Invention (105) | 1030 | 3 | 137 | Comp. 11, 12 |
| EXAMPLE 9 | Invention (120) | 800 | 3 | 226 | Comp. 11 |
| EXAMPLE 10 | Invention (145) | 1030 | 3 | 138 | Exam. 1, 3, 9 |
| COMP. EXAMPLE 1 | Precipitation (70) | 800 | 3 | 196 | Exam. 2, 6 |
| COMP. EXAMPLE 2 | Precipitation (70) | 1030 | 3 | 117 | Exam. 3 |
| COMP. EXAMPLE 3 | Marketed one | 1000 | 48 | 68 | Exam. 1, 3, 9 |
| COMP. EXAMPLE 4 | Precipitation (Room) | 800 | 3 | 77 | Exam. 2, 6 |
| COMP. EXAMPLE 5 | Precipitation (Room) | 1030 | 3 | 21 | Exam. 2, 6 |
| COMP. EXAMPLE 6 | Precipitation (Room) | 1030 | 3 | 63 | Exam. 2, 6 |
| COMP. EXAMPLE 7 | Like Invention (120) | 1030 | 3 | 83 | Exam. 2, 6 |
| COMP. EXAMPLE 8 | Like Invention (120) | 1030 | 3 | 115 | Exam. 2, 6 |
| COMP. EXAMPLE 9 | Like Invention (120) | 1030 | 3 | 122 | Exam. 2, 6 |
| COMP. EXAMPLE 10 | Like Invention (120) | 1030 | 3 | 121 | Exam. 2, 6 |
| COMP. EXAMPLE 11 | Like Invention (98) | 1030 | 3 | 121 | Exam. 2, 6, 8 |
| COMP. EXAMPLE 12 | Like Invention (80) | 1030 | 3 | 120 | Exam. 2, 6, 8 |

What is claimed is:

1. A process of producing alumina, comprising the steps of:

dissolving aluminum alkoxide in hexylene glycol to form a solution;

heating said solution at a temperature falling in a range from 101° C. to 200° C. to produce a sol;

hydrolyzing said sol to obtain a gel by adding water in an amount of less than or equal to 20 mol versus 1 mol of aluminum oxide;

drying said gel; and baking said dried gel at a temperature higher than or equal to 750° C.

2. A process as claimed in claim 1, wherein said hexylene glycol is in the form of 2-methlylpentane-2,4-diol.

3. A process as claimed in claim 1, wherein said hexylene glycol is present in an amount greater than or equal to 0.5 mol versus 1 mol of aluminum alkoxide.

4. A process as claimed in claim 3, wherein said hexylene glycol is present in an amount less than or equal to 3 mol versus 1 mol of aluminum alkoxide.

5. A process as claimed in claim 1, wherein water is added in said hydrolyzing step in an amount of more than or equal to 0.5 mol versus 1 mol of aluminum alkoxide.

6. A process as claimed in claim 5, wherein water is added in an amount ranging from 2 mol to 10 mol versus 1 mol of aluminum alkoxide.

7. A process as claimed in claim 1, wherein said aluminum alkoxide is selected from a group consisting of aluminum methoxide, aluminum ethoxide, aluminum iso-propoxide, aluminum n-propoxide, aluminum n-butoxide, aluminum sec-butoxide and aluminum tert-butoxide.

8. A process of producing an alumina, coated support comprising the steps of:

dissolving aluminum alkoxide in hexylene glycol to form a solution;

heating said solution at a temperature falling in a range from 101° C. to 200° C. to produce a sol;

hyrolyzing said sol to obtain a gel by adding water in an amount of less than or equal to 20 mol versus 1 mol of aluminum oxide;

putting said gel onto a support;

drying said gel; and baking said dried gel at a temperature higher than or equal to 750° C.

9. A process of producing an alumina, coated support comprising the steps of:

dissolving aluminum alkoxide in hexylene glycol to form a solution;

heating said solution at a temperature falling in a range from 101° C to 200° C to produce a sol;

hyrolyzing said sol to obtain a gel by adding water in an amount of less than or equal to 20 mol versus 1 mol of aluminum oxide;

impregnating a support with said gel;

drying said gel; and baking said dried gel at a temperature higher than or equal to 750° C.

* * * * *